Patented Oct. 28, 1924.

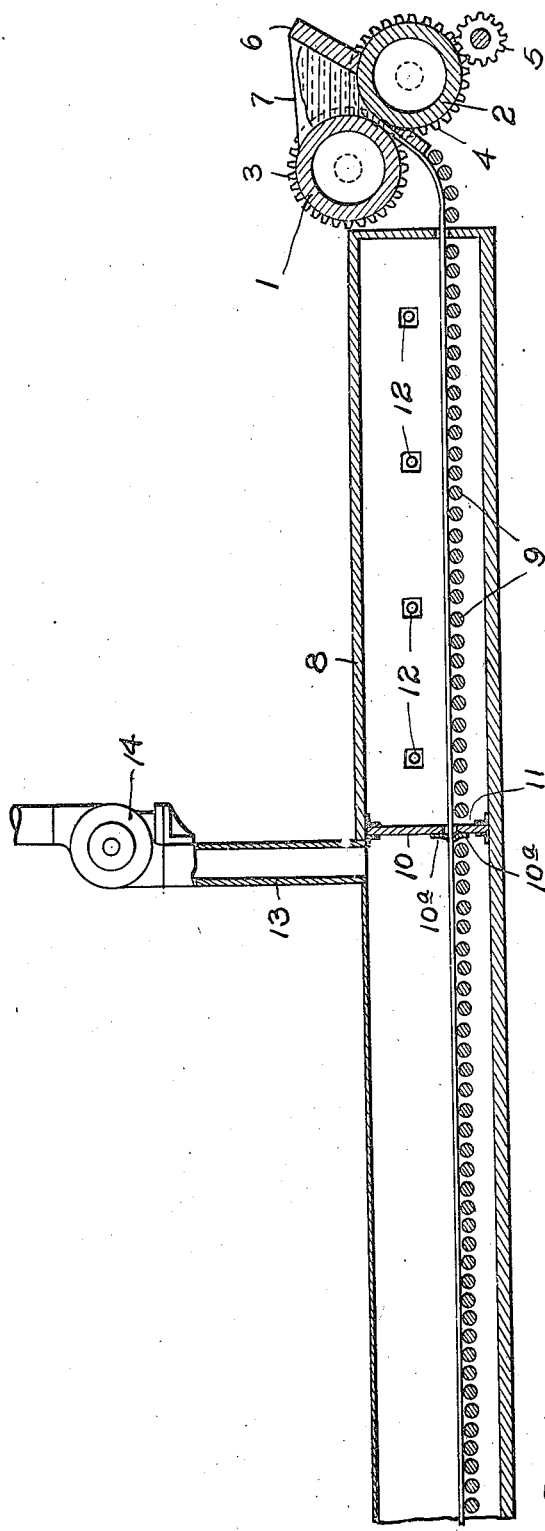

1,513,544

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

PROCESS AND APPARATUS FOR FORMING AND ANNEALING SHEET GLASS.

Application filed January 23, 1922. Serial No. 531,055.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Processes and Apparatus for Forming and Annealing Sheet Glass, of which the following is a specification.

The invention relates to an apparatus and process for producing annealed sheet glass, which is produced in ribbon form. This may be accomplished in connection with a ribbon forming operation carried on by continuous delivery from a tank as shown and described in my application Serial No. 493,311, filed August 18th, 1921, or by some other tank delivery apparatus capable of producing a plastic ribbon, or by a pouring operation as shown and described in the present application. One form of apparatus for carrying out the process is illustrated in the accompanying drawing, wherein:

The figure is a vertical section through the apparatus shown in very simple diagrammatic form.

As here shown, 1 and 2 are a pair of feed rolls carrying upon their axles the intermeshing spur gears 3 and 4, the gear 4 being driven from a pinion 5, itself driven by suitable power means not shown. The rolls 1 and 2 are preferably made hollow and provided with suitable cooling means such as connections as shown in said application whereby water may be circulated through the rolls to prevent overheating. A back plate 6 and end plates 7 serve to provide a hopper construction for holding the body of molten glass which is to be rolled into a continuous ribbon. The glass may be supplied to the rolls by means of a pot carried by a crane as is done in the ordinary plate glass casting operation.

Placed in front of the rolls and in line therewith is an annealing leer 8, provided with a series of rollers 9 for advancing the ribbon formed between the rolls through the leer. These rolls are driven and placed sufficiently close together to prevent the glass sagging at the entrance end of the leer. The glass enters at this point in a semi-plastic or yielding condition, and if the rollers were set too far apart there would be a tendency of the glass to bend intermediate the rollers. By placing the rolls close together and driving them, the glass is kept perfectly flat, this requirement particularly existing at the entrance end of the leer, as in later stages the glass is sufficiently stiff to maintain itself against bending even though the rolls are spaced a considerable distance apart. The leer is divided into two parts by the baffle walls 10 and 11, the portion nearest the rolls being the annealing end, while the other portion is the cooling end. The baffle walls 10 and 11 come very close to the glass so that there is no circulation of air from the cooling end to the annealing end, and if desired these walls may be provided at their ends with yielding portions of asbestos 10$^A$ or other suitable material for actually contacting with the glass. The annealing end may be heated in any suitable manner, as, for instance, by the burners 12, although a very considerable amount of heat is derived from the ribbon itself, which enters the leer when it is of a red color and upwards of 1200° F. The length of the annealing end is made such that in passing through this portion the ribbon drops through a range from the setting point, which is about 1200° F., to a temperature of about 950° F. This drop in temperature must be made slowly in order to secure the proper annealing effect and remove any strain which exists in the glass. This annealing action all occurs above the 950° F. point which is commonly referred to as the "critical annealing range," so after the glass drops below this point it is not adversely effected by a very rapid cooling.

From the baffle walls on through the cooling end of the leer it is desirable to secure a rapid drop in temperature in order to keep the leer at a minimum length and save time. Various means may be applied for hastening the cooling of the glass during its travel through this portion of the leer, but the means preferably employed is a circulation of air longitudinally of the glass, which is accomplished by providing the stack 12 and by the use of a fan 13 or other suitable means drawing the air through this stack and through the length of the cooling end of the leer. Various other expedients may, of course, be employed for giving the desired circulation. The glass is preferably cooled so that it leaves the leer at a temperature around 200°, at which temperature it can be readily handled.

Since the surface of the glass sheet is chilled by contact with the rolls 1 and 2 while the interior of the sheet is at a much higher temperature, it is necessary, in order to avoid warping and strain due to this uneven heat condition, to bring the sheet to uniform temperature after the sheet passes such rolls and either before or immediately after it enters the leer. In my copending application, Serial Number 656,441, burners are shown for applying the necessary heat before the glass enters the leer, but no such means are shown here, as the application of this additional heat may be accomplished in the entrance portion of the leer. This secures a uniform temperature of the sheet so that it will flatten out as it passes along the rolls, if not already perfectly flat, and will keep such flatness during the entire annealing operation.

The operation produces very flat glass having a surface which is much smoother than that of ordinary cast plate glass, so that the glass may be made thinner and the cost of grinding is materially reduced. The leer, by reason of the complete separation of the annealing and cooling ends, can be made much shorter than the ordinary plate glass leer, so that the operation of annealing is more rapid and less expensive and the cost of the leer is also much less because of its size and because of the simplicity of its construction. The upkeep of a leer of this kind is also much less than the ordinary plate glass leer. The foregoing and other advantages will be readily appreciated by those skilled in the art.

What I claim is:

1. A process of forming sheet glass which consists in rolling a molten mass of glass into a ribbon, feeding the ribbon while at a high temperature into a leer, maintaining the glass flat in the leer while advancing it therethrough, causing the glass to cool slowly from the temperature of setting to a temperature of approximately 950°F, and then applying artificial cooling means to the ribbon to hasten its cooling during the remainder of its progress through the leer.

2. A process of forming sheet glass which consists in rolling a molten mass of glass into a ribbon, feeding the ribbon into a leer, maintaining the glass flat while advancing it through the leer, causing the glass to cool very slowly as it passes through the first part of the leer and while it is cooling from setting temperature to approximately 950°F, and then applying means to cause a more rapid cooling of the ribbon during its last period of travel through the leer.

3. A process of forming sheet glass which consists in rolling a molten mass of glass into a ribbon, feeding the ribbon into a leer while still plastic, maintaining the glass flat while advancing it through the leer and causing it to cool very slowly until it reaches a temperature below the critical annealing range, and then applying means to cause the rapid cooling of the glass during its last period of travel through the leer.

4. In combination with means for forming and feeding ahead a ribbon of plastic glass, of a leer in line therewith provided with rollers for advancing the ribbon therethrough, means dividing the leer into an annealing end and a cooling end and sealing off the annealing end against currents of air from the cooling end, and means for circulating a cooling current of air longitudinally of the said cooling end from the outer end thereof inward to promote the rapid cooling of the ribbon after it leaves said annealing end.

5. In combination with means for forming and feeding ahead a ribbon of plastic glass, of a leer in line therewith provided with rollers for advancing the ribbon therethrough, baffle means extending from the upper side of the glass to the ceiling of the leer and from the lower side of the glass to the floor of the leer for dividing the leer into an annealing end and a cooling end, and means to cause the rapid cooling of the ribbon during its last period of travel through the leer.

6. A process of forming sheet glass which consists in rolling a molten mass of glass into a ribbon of uniform thickness between cooled rolls which provides a sheet of glass cooler at the surface than in its center, bringing the sheet to uniform temperature from surface to surface at a temperature above the setting point of the glass, allowing the glass to cool very slowly through the critical annealing range, and then applying means to cause a rapid cooling of the glass.

In testimony whereof, I have hereunto subscribed my name this 16th day of January, 1922.

FREDERICK GELSTHARP.